June 3, 1969  J. H. BROWN  3,447,785
WINCH FOR RAISING AND LOWERING MOTOR VEHICLE ENGINES
Filed Aug. 18, 1967

INVENTOR
Jack H. Brown
BY Alexander B Blair
ATTORNEY

June 3, 1969   J. H. BROWN   3,447,785
WINCH FOR RAISING AND LOWERING MOTOR VEHICLE ENGINES
Filed Aug. 18, 1967   Sheet 2 of 2
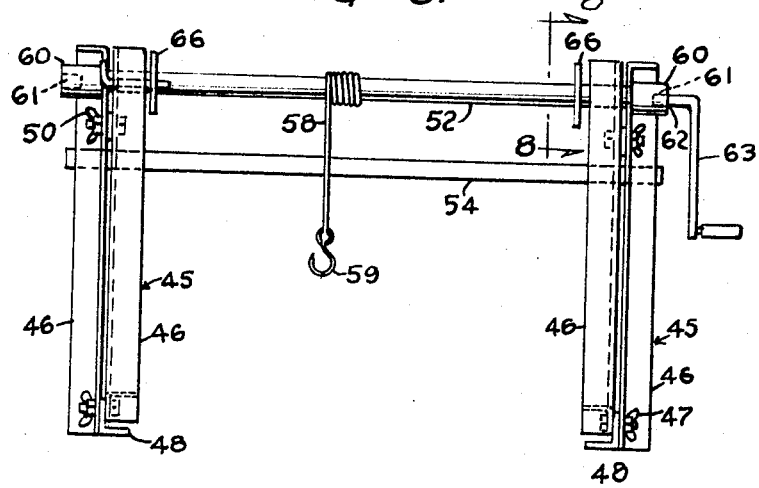
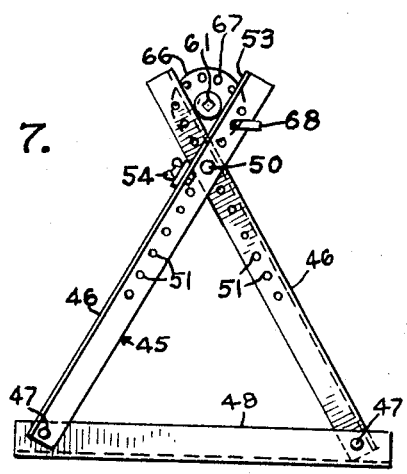
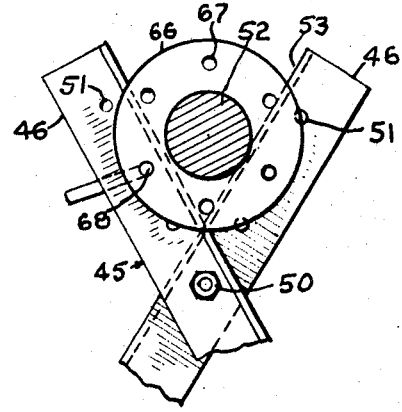
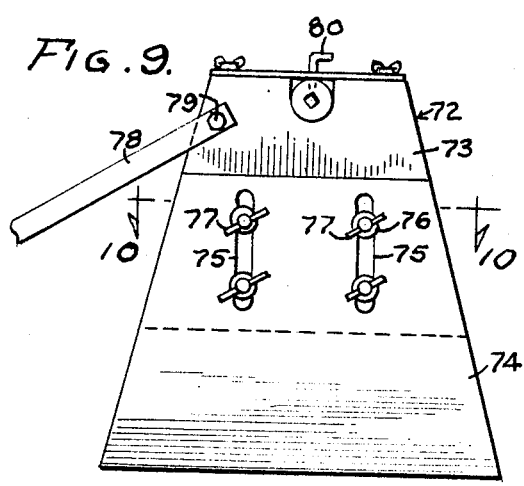
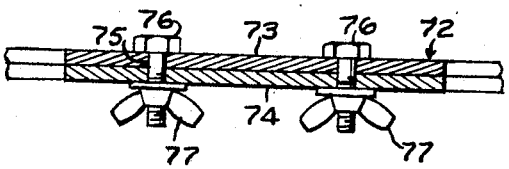
INVENTOR
Jack H. Brown
BY
ATTORNEY

United States Patent Office 3,447,785
Patented June 3, 1969

3,447,785
WINCH FOR RAISING AND LOWERING MOTOR VEHICLE ENGINES
Jack H. Brown, 4633 Lippi Parkway,
Sacramento, Calif. 95823
Filed Aug. 18, 1967, Ser. No. 661,678
Int. Cl. B66c 23/60
U.S. Cl. 254—145                    3 Claims

ABSTRACT OF THE DISCLOSURE

Spaced vertical supports are adapted to rest usually on the frame of a rear engine vehicle, and a cross shaft supported at the top of the structure is adapted to be turned to wind a cable to raise the engine, particularly of a rear engine car, after the attaching bolts thereof have been loosened, enlargements at the ends of the shaft serving to position it longitudinally and providing sockets for the reception of a crank handle, ratchet or other shaft-turning means.

Background of the invention

For lifting engines out of motor vehicles, it is a common practice to provide an overhead crane adapted to move along a track and provided with suitable block and tackle means including a chain or cable having a hook engageable with an eye carried by a motor vehicle engine to facilitate the lifting thereof from the vehicle for the performance of work on the engine.

Summary of the invention

The device comprises spaced upstanding supports of generally triangular shape with an elongated lower base adapted to be supported on the chassis frame of the vehicle. The upper ends of the supports have open-top recesses to receive a cross shaft to which a cable is attached, such cable having a hook at its lower end engageable with an eye carried by the motor vehicle engine, the invention being particularly adapted for raising and lowering engines of rear engine vehicles. The shaft is provided outwardly of the supports with collars or other enlargements which position the shaft longitudinally thereof and each enlargement is provided with a polygonal socket to receive the similarly shaped end of a crank or ratchet for rotating the shaft. The shaft is provided with an annular portion or an annular member having openings for receiving a locking pin to support the motor vehicle engine in elevated position. A bracing tie member extends angularly between the supports to brace them, and is readily removable for folding the device for storage. The two supports are readily separable by removing the brace and by lifting the shaft from the tops of the supports. The entire structure occupies little space in storage.

Brief description of the drawings

FIGURE 6 is a side elevation of a modified form of the invention;

FIGURE 7 is an end elevation looking from the left side of FIGURE 6;

FIGURE 8 is an enlarged fragmentary section on line 8—8 of FIGURE 6;

FIGURE 9 is an end elevation of another modification of the invention; and

FIGURE 10 is an enlarged detailed section on line 10—10 of FIGURE 9.

Description of the preferred embodiments

Figure 1:
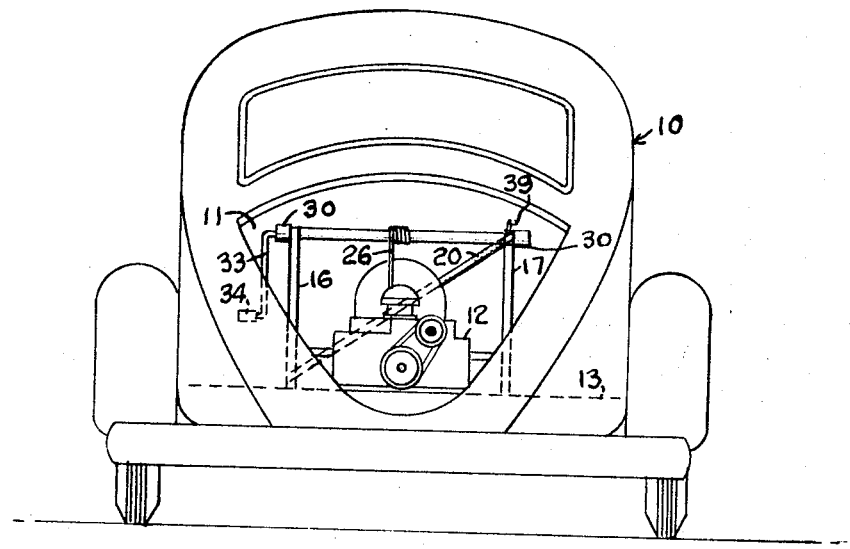
FIGURE 1 is a rear elevation of a rear engine vehicle with the engine compartment cover removed showing the winch in operative position therein.
Figure 2:
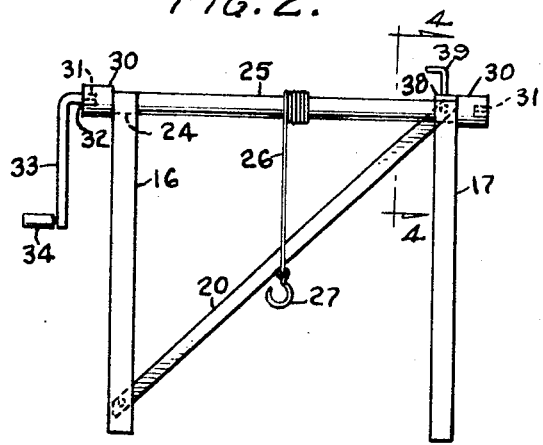
FIGURE 2 is a rear elevation of the winch structure shown separate from the vehicle.

Referring to FIGURE 1, numeral 10 designated a motor vehicle as a whole of the rear engine type having an engine compartment 11 and a conventional engine 12 supported on the usual chassis frame members 13 and secured in position by conventional bolts (not shown).

Figure 3:
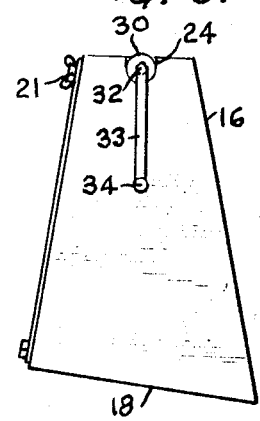
FIGURE 3 is an end elevation of the device looking from the left-hand side of FIGURE 2.
Figure 4:
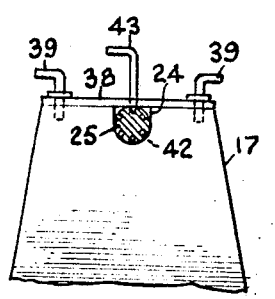
FIGURE 4 is a fragmentary sectional view on line 4—4 of FIGURE 2.

The present invention comprises spaced opposite upstanding supports 16 and 17 of generally triangular shape, each having an elongated base 18 adapted to rest on the chassis frame members 13 as shown in FIGURE 1. The supports are connected by an angular brace 20 secured at opposite ends, respectively, to the lower end of one support and to the upper end of the other support, the brace preferably being attached by wing nuts 21 (FIGURE 3) to permit the ready attaching and detaching of the brace.

The upper end of each support is provided with a recess 24. These recesses are aligned and receive a tranverse shaft 25 to which is attached a cable 26 having a hook 27 at its free end engageable with a suitable eye (not shown) caried by the top of the engine, preferably in vertical alignment with the center of gravity of the engine.

Each end of the shaft 25 is provided with a collar or enlargement 30 arranged beyond the remote sides of the supports and engageable therewith to position the shaft 25 longitudinally thereof. Each collar 30 is provided with a polygonal socket 31 to receive the correspondingly spaced end 32 of a crank 33 having a handle 34. The crank is shown for the purpose of illustration only, and it will be apparent that any suitable type of manually or power operated ratchet mechanism may be used for rotating the shaft 25. It will be apparent that the enlargements 30 have the double function of positioning the shaft 25 longitudinally and of providing means through which the shaft may be rotated.

Figure 5:
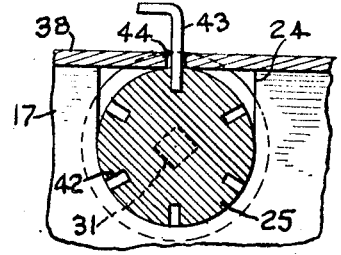
FIGURE 5 is an enlarged fragmentary section on line 5—5 of FIGURE 2.

The recess 24 in the support 17 is closed by a plate 38 attached to said support by wing nuts 39 to permit the plate to be readily detached for the removal of the shaft 25. This shaft within the recess 24 of the support 17 is provided with radial openings 42 (FIGURE 5) to receive a locking pin 43 slideable through an opening 44 in the plate 38.

A modified form of the invention is shown in FIGURES 6, 7 and 8 wherein identical supports 45 may be used and formed of upwardly converging angle irons 46 detachably fixed as at 47 at their lower ends to a base member 48 adapted to rest on the chassis frame members 13 or other supporting surface. The upper ends of the angle irons cross and are detachably connected by bolts 50 selectively insertable through openings 51 depending upon the height desired of the cross shaft 52, which corresponds to the shaft 25 previously described. This shaft rests in the recesses 53 formed between the upper ends of the angle irons 46 to be rotatably positioned in proper position. A brace 54, similar to the brace 20, is connected between the supports 45, extending anglewise thereof, as shown in FIGURE 6, and readily attachable and detachable by the use of wing nuts 65.

The shaft 52 has a cable 58 connected thereto and provided at its free end with an attaching hook 59. As in the previous form of the invention, the shaft 52 is provided at opposite ends with collars or enlargements 60 to position the shaft 52 endwise thereof, and these enlargements have polygonal sockets 61 to receive the similarly shaped end 62 of a crank 63 or other shaft rotating means.

Adjacent each one of the supports 45, the shaft 52 is provided with a flange 66 apertured as at 67 to receive a locking pin 68 slidable in one of the supports 46. This locking pin serves to prevent turning movement of the shaft 52 after the motor vehicle engine has been elevated to the desired point.

The form of the invention shown in FIGURES 9 and 10 is so constructed as to permit the supporting of the winch shaft by means arranged outwardly of the sides of the vehicle and resting on the floor. In such form of the invention, supports indicated as a whole by the numeral 72 are employed, each support comprising upper and lower body members 73 and 74 arranged in overlapping relation. These body members are provided with vertical slots 75 through which extend bolts 76 and wing nuts 77, whereby the two members 73 and 74 of each support may be vertically adjustable relative to each other. If desired, an angle brace 78 may be detachably connected as at 79 to one or both of the supports 72 and fixed at its remote end to anything which may be conveniently available for this purpose. A locking pin 80 may be employed in the same manner as in the preferred form of the invention to lock the winch shaft in any desired position.

In each form of the invention, the winch shaft is rotated in any suitable manner to lift a motor vehicle engine or to lower it in position. Of course, when an engine is to be lifted, the attaching bolts are first removed, and such bolts are re-applied when the engine is returned to its normal position. In each form of the invention all of the parts are readily detachable from each other so that the device may be taken apart and stored in a limited space. The enlargements on the ends of the shaft serve the dual purpose of positioning the shaft longitudinally and of providing means for attaching to the shaft any desired means for applying a rotating force thereto. In each form of the invention the shaft may be locked with the vehicle engine elevated to the desired extent. In each form of the invention support is provided with open-topped recesses to support the winch shaft in position. These recesses need not be closed, but one of the supports in the forms of the invention shown in FIGURES 1 to 5, inclusive, and 9 and 10 may be provided with readily detachable plates to support the locking pin.

While the invention has been illustrated and described particularly with reference to the lifting of motor vehicle engines, it will be apparent that it may find many other uses in motor vehicle and other shops.

What is claimed is:

1. A winch comprising upstanding spaced supports each having an open-topped recess in the top thereof, a shaft mounted in said recesses and projecting beyond said support, a lifting cable connected to said shaft between said supports, and enlargements on the ends of said shaft beyond the remote sides of said supports to position said shaft endwise thereof, each enlargement forming an extremity of the shaft and provided with a polygonal socket for the reception of means for turning said shaft, each support comprising a pair of crossed angle irons detachably connected at their crossing point and having their upper extremities diverging to form a recess, the lower ends of said angle irons being substantially spaced from each other, and a connecting angle iron extending between and detachably connected to the lower ends of said crossed angle irons, said shaft being provided adjacent one of said supports with an annular flange having circumferentially spaced openings, and a locking pin engageable in one of said openings and extending slidably through one of said crossed angle irons above said crossing point.

2. The structure of claim 1 wherein a base is provided for each pair of crossed angle irons, the lower end of each angle iron being pivotally secured to said base.

3. The structure of claim 1 wherein each angle iron is provided with a plurality of aligned openings, the detachable connection for each pair of crossed angle irons comprising a bolt passed through selected aligned openings in each pair to vary the effective height of the recess formed by the diverging ends.

References Cited

UNITED STATES PATENTS

| | | | |
|---|---|---|---|
| 626,102 | 5/1899 | Scott | 254—145 |
| 1,857,579 | 5/1932 | Armstrong | 245—145 |
| 1,952,238 | 3/1934 | Dice | 254—145 |
| 2,123,398 | 7/1938 | Bowers | 254—136 |
| 2,730,244 | 1/1956 | Berggren | 254—145 |
| 3,318,464 | 5/1967 | Vernor | 254—145 |

RICHARD E. AEGERTER, *Primary Examiner.*

HARVEY C. HORNSBY, *Assistant Examiner.*